United States Patent
Mysen et al.

(10) Patent No.: US 9,401,965 B2
(45) Date of Patent: Jul. 26, 2016

(54) CORRELATING USER INTERACTIONS WITH INTERFACES

(75) Inventors: Clarence C. Mysen, San Francisco, CA (US); Emily K. Moxley, San Francisco, CA (US)

(73) Assignee: Google Inc., Mountain View, CA (US)

( * ) Notice: Subject to any disclaimer, the term of this patent is extended or adjusted under 35 U.S.C. 154(b) by 733 days.

(21) Appl. No.: 12/964,360

(22) Filed: Dec. 9, 2010

(65) Prior Publication Data

US 2012/0151359 A1 Jun. 14, 2012

(51) Int. Cl.
*H04L 29/08* (2006.01)
*H04L 12/26* (2006.01)
*G06F 11/34* (2006.01)

(52) U.S. Cl.
CPC ............ *H04L 67/22* (2013.01); *G06F 11/3438* (2013.01); *H04L 43/062* (2013.01); *H04L 43/08* (2013.01); *G06F 11/3476* (2013.01); *G06F 11/3495* (2013.01); *G06F 2201/875* (2013.01)

(58) Field of Classification Search
CPC ....... H04L 41/22; H04L 41/14; H04L 43/062; H04L 43/08; H04L 67/22; G06F 11/3438; G06F 11/34
USPC .......................................................... 715/736
See application file for complete search history.

(56) References Cited

U.S. PATENT DOCUMENTS

| | | | |
|---|---|---|---|
| 2007/0011057 A1* | 1/2007 | Archer et al. ................... | 705/26 |
| 2007/0214097 A1 | 9/2007 | Parsons et al. | |
| 2008/0086558 A1* | 4/2008 | Bahadori et al. ............... | 709/224 |
| 2008/0114878 A1* | 5/2008 | Gopalkrishnan et al. ..... | 709/224 |
| 2008/0250136 A1* | 10/2008 | Izrailevsky et al. ........... | 709/224 |
| 2009/0019372 A1 | 1/2009 | Chu et al. | |
| 2009/0083418 A1 | 3/2009 | Krishnamurthy et al. | |
| 2009/0106081 A1* | 4/2009 | Burgess et al. ................. | 705/10 |
| 2009/0172551 A1* | 7/2009 | Kane et al. ..................... | 715/733 |
| 2009/0192881 A1 | 7/2009 | Pierre | |
| 2009/0248493 A1* | 10/2009 | Flake et al. ..................... | 705/10 |
| 2010/0010866 A1 | 1/2010 | Bal et al. | |
| 2010/0070514 A1* | 3/2010 | Woodruff ....................... | 707/754 |
| 2010/0082660 A1* | 4/2010 | Muilenburg et al. ......... | 707/768 |
| 2010/0082778 A1* | 4/2010 | Muilenburg et al. ......... | 709/220 |
| 2010/0091676 A1* | 4/2010 | Moran et al. ................... | 370/252 |
| 2010/0146110 A1* | 6/2010 | Christensen et al. ......... | 709/224 |
| 2011/0022704 A1* | 1/2011 | Duan et al. ..................... | 709/224 |
| 2011/0029665 A1* | 2/2011 | Wenig et al. ................... | 709/224 |
| 2011/0082858 A1* | 4/2011 | Yu et al. ......................... | 707/727 |
| 2011/0125593 A1* | 5/2011 | Wright et al. .............. | 705/14.73 |
| 2011/0145398 A1* | 6/2011 | Bansal et al. .................. | 709/224 |

(Continued)

OTHER PUBLICATIONS

Authorized officer Yun Kwon Nam, International Search Report and Written Opinion in PCT/US2011/063570, mailed May 25, 2012, 10 pages.

(Continued)

*Primary Examiner* — Nicholas Ulrich
(74) *Attorney, Agent, or Firm* — McDermott Will & Emery LLP (57) ABSTRACT

Methods, systems, and computer program products are provided for tracking user interactions with interfaces and determining social data. One example method includes receiving from an entity an indication of interfaces that are used to interact with users, registering the user interfaces, tracking user interaction with the interfaces, and using the tracking information to determine all actions associated with a given user that are to be attributed to the entity.

28 Claims, 8 Drawing Sheets

(56) References Cited

U.S. PATENT DOCUMENTS

| | | | |
|---|---|---|---|
| 2011/0153796 A1* | 6/2011 | Branson | 709/223 |
| 2011/0191179 A1* | 8/2011 | Linietsky et al. | 705/14.53 |
| 2011/0314114 A1* | 12/2011 | Young et al. | 709/206 |
| 2011/0320373 A1* | 12/2011 | Lee et al. | 705/319 |
| 2012/0117006 A1* | 5/2012 | Sathish | 706/12 |

OTHER PUBLICATIONS

Hossack, John; "The Complete Guide to Google Analytics Power User Guide;" VKI Studios; Jun. 5, 2009.

Warren, Christina; "PostRank combines Google Analytics with Social Media Stats;" Sep. 24, 2009.

* cited by examiner

CORRELATING USER INTERACTIONS WITH INTERFACES

BACKGROUND

This specification generally relates to analyzing information.

Web analytics systems may assist web site owners with tracking user interactions with the web site. Based on user interactions, such as which pages are visited and for how long, and the sorts of interactions that occurred, various user characteristics may be inferred. Social marketing campaigns may involve multiple web sites, some of which may be maintained by the marketer and some of which may be maintained by third parties.

SUMMARY

In general, one innovative aspect of the subject matter described in this specification may be embodied in methods, systems, and computer program products for tracking user interactions with interfaces. One example method includes receiving from an entity (e.g., a sponsor of content) an indication of interfaces that are used to interact with users, registering the user interfaces including associating the user interfaces with the entity, tracking user interaction with the interfaces including attributing user interaction by a user in any of the interfaces as an interaction with the entity, and using the tracking information to determine all actions associated with a given user that are to be attributed to the entity. An indication can be received from the entity of one or more types of user interaction to track. The systems discussed here may provide one or more mechanisms for collecting personal information about users. Users may be provided with an opportunity to opt in/out of programs that may collect personalized information. In addition, certain data may be anonymized in one or more ways before it is stored or used, so that personally identifiable data is removed.

In general, another innovative aspect of the subject matter described in this specification may be embodied in methods that include the actions of identifying an entity, the entity having different interfaces for interacting with users, creating a profile for the entity including registering the different interfaces, tracking user interaction with the entity including determining tracking information that reflects individual user interaction by a respective user through one of the different interfaces, and correlating tracking information related to user interaction across the different interfaces. Correlating tracking information can include correlating a user interaction related to one of the interfaces with a user interaction with a different one of the interfaces associated with the entity.

In general, another innovative aspect of the subject matter described in this specification may be embodied in methods that include the actions of tracking users in a social context as users interact with an entity, including developing tracking information. Tracking information can include registering different user interfaces associated with the entity, each user interface being provided by the entity to support interaction with users, and tracking a user as the user interacts with the entity through the different interfaces. Tracking information relating to user interaction with the entity can be correlated across the different interfaces.

In general, another innovative aspect of the subject matter described in this specification may be embodied in methods that include the actions of receiving from an entity an indication of the entity's social identities, registering the social identities including associating the social identities with the entity, tracking user interactions with the entity including tracking user interactions by a user with the entity when using one of the social identities attributed to the entity (where tracking includes determining tracking information), and determining social data using the user tracking information.

In general, another innovative aspect of the subject matter described in this specification may be embodied in methods that include the actions of receiving an indication of a user interaction with an entity, the entity providing a user interface to the user, and tracking in another different user interface associated with the entity actions of the user after receipt of the indication.

These and other embodiments may each optionally include none, one or more of the following features. In various examples, receiving an indication of interfaces can include receiving an indication of one or more web interfaces. Receiving an indication of interfaces can include receiving an indication of a web interface associated with the entity and a social networking interface associated with the entity. The social networking interface can be a social networking interface such as a microblogging interface (for example, status updates, posts, message boards, etc.), a message forum interface, and a user review interface (for example, reviews of businesses, products, goods, services, etc.). Registering the user interfaces can include creating a profile for an entity and associating each interface with the entity.

Tracking user interaction with the interfaces can include tracking user interaction using cookies. User cookie information associated with user sessions with a given one of the user interfaces can be received. User cookies associated with the sessions can be received. Tracking user interaction can include using pixels to track user interactions. Tracking user interaction can include associating a user with multiple user identities. Using the tracking information can include determining that a user action that is detected at a first interface associated with the entity is related to information presented to the user on a second, different interface associated with the entity. Using the tracking information can include determining that a user action that is detected at a first interface associated with the entity is related to a user action that is detected at a second, different interface associated with the entity.

Receiving an indication of the entity's social identities can include receiving identifiers associated with the entity's social identities. The identifiers can include identifiers such as identifiers associated with social networking pages, identifiers associated with social networking profiles, identifiers associated with microblogging accounts, identifiers associated with user review accounts, identifiers associated with message forum user names, identifiers associated with blogs, identifiers associated with websites, identifiers associated with common tags, and identifiers associated with names, locations, or other information associated with a predetermined group of employees associated with the entity.

Determining social data can include following status and other communication signups by the user. Determining social data can include determining a number of mentions related to the entity. Determining social data can include determining a number of re-shares associated with the entity. Determining social data can include determining likes on a business site associated with the entity and likes on pages mentioning the entity. Determining social data can include determining communications or interactions by the user with the entity. The communications can include communications such as direct communications via replies, @replies, questions asked, or engagement with other followers. Determining social data can include determining a number of engaged friends of the user. Determining social data can include measuring user behaviors prior to and following different marketing campaigns provided by the entity on one or more sites associated with the entity. Social data can be provided to the entity.

Particular embodiments of the subject matter described in this specification may be implemented to realize none, one or more of the following advantages. The underlying value of social marketing efforts can be identified. Return on investment can be calculated for the efforts put into communications. The value of different interactions can be calculated to optimize user interactions. The potential for revenue can be tracked and social advertising spending can be optimized. Entities can be enabled to improve targeting of marketing and promotions to particular users or groups of users. Influential users can be identified.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

Like reference symbols in the various drawings indicate like elements.

DETAILED DESCRIPTION

In general, a system identifies correlations between actions performed by an entity and actions performed by system users. For example, the entity can be a sponsor of content, and can provide such content and information to be accessed by users through various user interfaces. The user interfaces can then be associated with the entity and registered by the system. User interaction with the interfaces can be tracked and correlated to identify patterns of user engagement in a social context. For example, the effectiveness of a social marketing campaign may be determined by analyzing the correlations between aspects of the campaign and actions of the users. The systems discussed here may provide one or more mechanisms for collecting personal information about users. Users may be provided with an opportunity to opt in/out of programs that may collect personalized information. In addition, certain data may be anonymized in one or more ways before it is stored or used, so that personally identifiable data is removed.

Figure 1:
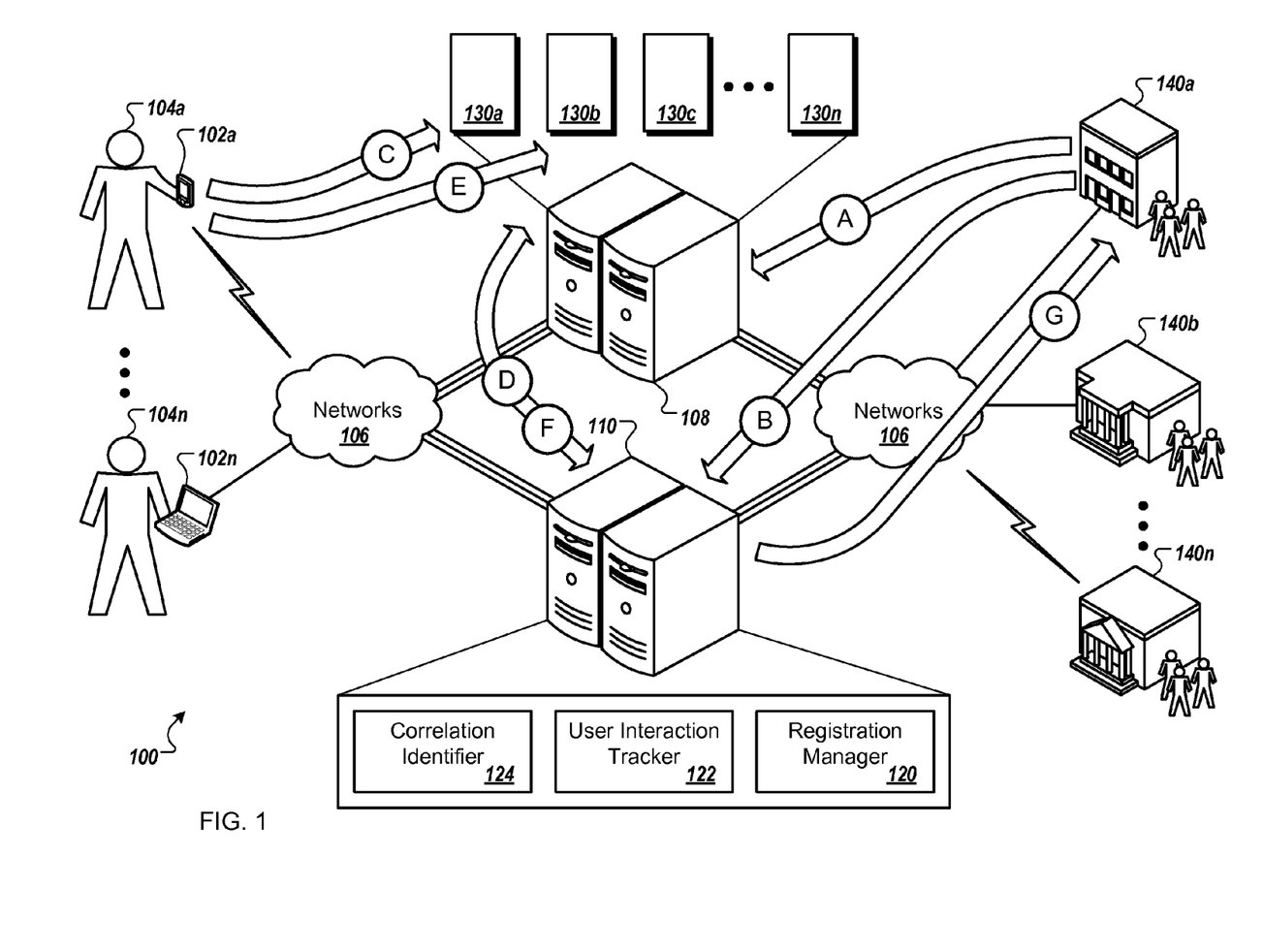
FIG. 1 is a diagram of an example system that can track and correlate information related to user interaction with interfaces associated with an entity.

FIG. 1 is a diagram of an example system 100 that can correlate information related to user interaction with interfaces associated with an entity. FIG. 1 also illustrates an example flow of data within the system 100 during states (A) to (G), where the states (A) to (G) may occur in the illustrated sequence, or they may occur in a sequence that is different than in the illustrated sequence.

In further detail, the system 100 includes one or more client computing devices 102 (each operated by a corresponding user 104) that communicates over one or more networks 106 with one or more content servers 108 and one or more computing servers 110. The networks 106 may include a wireless cellular network, a wireless local area network (WLAN) or WiFi network, a Third Generation (3G) or Fourth Generation (4G) mobile telecommunications network, a private network such as an intranet, a public network such as the Internet, or any appropriate combination thereof.

The client device(s) 102 may be any appropriate type of computing device (e.g., mobile phone, smart phone, PDA, music player, e-book reader, tablet computer, laptop or desktop computer, or other stationary or portable device) that includes one or more processors and computer readable media. Among other components, for example, the client device(s) 102 includes one or more processors, computer readable media that store software applications, input device(s) (e.g., touch screens, keyboards, computer mice, motion sensors and the like), output device(s) (e.g., display screens, speakers, and the like), and communications interfaces.

The content server(s) 108 may be configured to host and provide content (e.g., web pages, advertisements, posts, ratings, audio, video, photos, text, and the like) provided by one or more entities 140 to any of the client devices 102. For example, the entities 140 can represent sponsors of content such as organizations (e.g., businesses) or individuals. Each of the entities 140 may employ one or more computing devices (not shown), for communicating with the content server(s) 108 and the computing server(s) 110.

The computing server(s) 110 may be configured to execute application code associated with a variety of software components (e.g., modules, objects, libraries, services, and the like) including a registration manager 120, a user interaction tracker 122, and a correlation identifier 124. Two or more of the components 120, 122, and 124 may be implemented on the same computing device, or on different computing devices, such as devices included in a server farm or a peer-to-peer network.

Referring to the example flow of data, during state (A), an entity 140a provides/identifies content information to the content servers 108. In general, any of the entities 140 may provide content to the servers 108 using one or more computing devices (not shown) with wired or wireless connections to the networks 106. For example, the entities 140 may be organizations or individuals seeking contact with the users 104, such as businesses or agents. Content provided by the entities 140 can include information to be presented by interfaces 130 used to interact with the users 104. For example, the interfaces 130 may include web pages provided by various third party web sites (e.g., news sites, blogging sites, social networking sites, and the like), and web pages provided by web sites maintained by each of the entities 140. In the present example, the entity 140a provides content (e.g., a video promoting a product or service, a press release about a store opening, a blog post about an upcoming event, etc.) to one or more of the content servers 108, and the content is made available from one or more of the interfaces 130.

During state (B), the computing server(s) 110 receives an indication of interfaces 130 used by the entity 140a to interact with the users 104. For example, the entity 140a may provide information associated with one or more web sites hosting the provided content, and may provide information associated with various online presences maintained by the entity, such as social networking pages, blogs, web sites, and the like. Using the registration manager 120, for example, the server(s) 110 can associate the interfaces 130 with the entity 140a.

During state (C), the user 104a employs the client device 102a to interact with an interface 130a. For example, interface 130a may be provided by a web site hosting content (e.g., a viral advertising video) from the entity 140a. Using the interface 130a, for example, the user 104a can access the content.

During state (D), the user interaction tracker 122 can attribute interaction of the user 104a with the interface 130a as an interaction with the entity 140a. Various mechanisms for attributing user interactions are possible. For example, the content server(s) 108 can maintain session information of the user 104a and can provide the session information to the computing server(s) 110. The users 104 may be provided with an opportunity to opt in/out of programs that may collect personalized information, and may be informed of the accompanying limitations on the functionality of a service that may result from such a decision. In addition, certain data may be anonymized in one or more ways before it is stored or used, so that personally identifiable data is removed. In order to preserve user privacy, for example, the user 104a may be enabled to opt out, and/or user information provided to the computing server(s) 110 may be generalized and/or anonymized. In some implementations, aggregate statistics tracking may be used to correlate aggregated user behaviors to the actions of one or more entities. For example, timelines can be used to track changes (e.g., frequency changes, topic changes, sentiment changes) to discussions between users about an entity in relation to a social media campaign.

During state (E), the user 104a employs the client device 102a to interact with a second different user interface (e.g., the interface 130b). For example, interface 130b may be provided by a web site hosting a social networking presence (e.g., a social networking site) associated with the entity 140a. User interactions may include posting a comment or link, asking a question, or some other interaction. During state (F), the user interaction tracker 122 can attribute the interaction of the user 104a with the interface 130b as an interaction with the entity 140a. For example, the user interaction tracker 122 can identify text associated with posted comments or questions, and can identify provided links to classify the interaction.

In some implementations, user interactions during states (C) and (E) may be with interfaces provided by entities, interfaces maintained by entities, and interfaces provided or maintained by third parties that include information and content related to entities. For example, the interfaces 130 can include one or more web sites provided by the entity 140a, one or more social networking web sites maintained by the entity 140a, and one or more third party sites such as e-commerce sites, message forum sites, and content provider sites. In some implementations, interactions may include direct interactions with an entity. For example, the user 104a may post a comment to a social networking page maintained by the entity 140a. In some implementations, interactions may be indirect. For example, one or more users 104 may post public comments or engage in a discussion with other users about a product or service of the entity 140a using a product forum site or review site maintained by a third party.

During state (G), the correlation identifier 124 can correlate tracking information related to interaction of the user 104a across the different interfaces 130a, 130b, and can provide information associated with the correlation to the entity 140a. For example, the correlation identifier 124 may determine that the user 104a had viewed a viral advertising video associated with a particular product offered by the entity 140a, and had subsequently visited a social networking site associated with the entity 140a and posted a comment about the video or about the product. By classifying such engagement patterns, for example, entities can understand how different types of engagement affect future user behavior. For example, by tracking and correlating interactions of user(s) 104, the entity 140a may be enabled to discover information about the value of its social marketing efforts.

Figure 2:
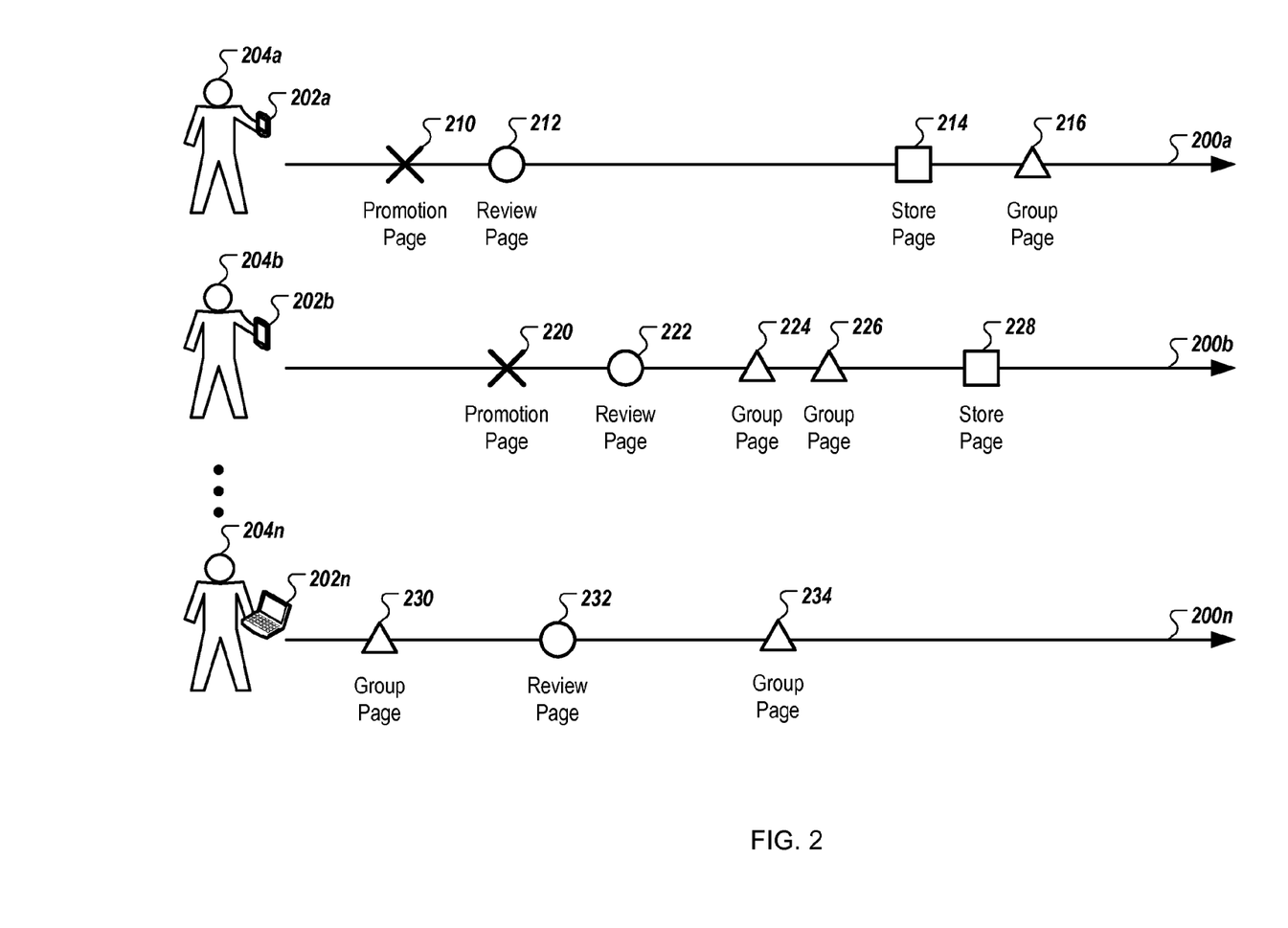
FIG. 2 is a diagram of example timelines representing user interactions with interfaces.

FIG. 2 is a diagram of example timelines 200 representing user interactions with interfaces. In general, user(s) 204 can employ client computing device(s) 202 to interact with a plurality user interfaces associated with an entity. A timeline may be maintained for each of the users 204, for example, by the user interaction tracker 122 (shown in FIG. 1). By analyzing tracked interface interactions of the users 204 along corresponding timelines 200, patterns of user engagement and correlations between interface interactions may be identified, for example, by the correlation identifier 124 (also shown in FIG. 1).

In the present example, user 204a employs computing device 202a to interact with a promotional web page at point 210 in the timeline 200a. For example, the web page may include promotional information describing a new product available for purchase. After interacting with the promotional web page, at point 212 in the timeline 200a the user 204a interacts with a review page associated with the product. For example, it may be determined that the user 204a views reviews for the product posted by other users. After viewing product reviews, for example, the user 204a interacts with an e-commerce store page at point 214 in the timeline 200a. For example, it may be determined that the user purchases the product described in the promotional and store pages. After purchasing the product, for example, the user 204a interacts with a product group page at point 216 in the timeline 200a. For example, the user 204a may use the product group page to join a social networking group for owners of the product.

In the present example, user 204b can employ computing device 202b to interact with the promotional web page at point 220 in the timeline 200b, and to interact with the review page at point 222. It may be determined that the user 204b views the same product reviews as the user 204a, or different product reviews. For example, comparing timelines 200b and 200a, as point 222 in timeline 200b is shown to occur after point 212 in timeline 200a, user 204b may be determined to have viewed one or more reviews that had not been available to user 204a. After viewing the review page, for example, the user 204b interacts with the product group page at point 224 in the timeline 200b. For example, it may be determined that the user 204b publicly posts a question related to the product. At point 226 in the timeline 200b, for example, the user 204b returns to the group page 226 to read an answer to the posted question, and at point 228, the user interacts with the store page to purchase the product.

In the present example, user 204n can employ computing device 202n to interact with the product group page at point 230 in the timeline 200n. For example, the user 204n may be an early adopter of the product, and a long-time member of the group. At point 232 in the timeline 200n, for example, the user 204n interacts with the review page. For example, it may be determined that the user 204n posts a favorable review about the product. The user 204n again interacts with the group page at point 234 in the timeline 200n, for example, to answer the question about the product posted by the user 204b.

Various user engagement patterns and interface interaction correlations may be identified by analyzing the timelines 200 in the present example. For example, it may be determined that after visiting the promotional page, users generally read reviews posted by other users at the review page. In addition, influential users may be identified by analyzing the example timelines 200. For example, as user 204n posted a favorable product review, and as user 204n answered the question about the product posted by user 204b, and as user 204b subsequently purchased the product, user 204n may be identified as an influential user. By identifying influential users, for example, entities may be enabled to improve targeting of marketing and promotions efforts to particular users.

Figure 3:
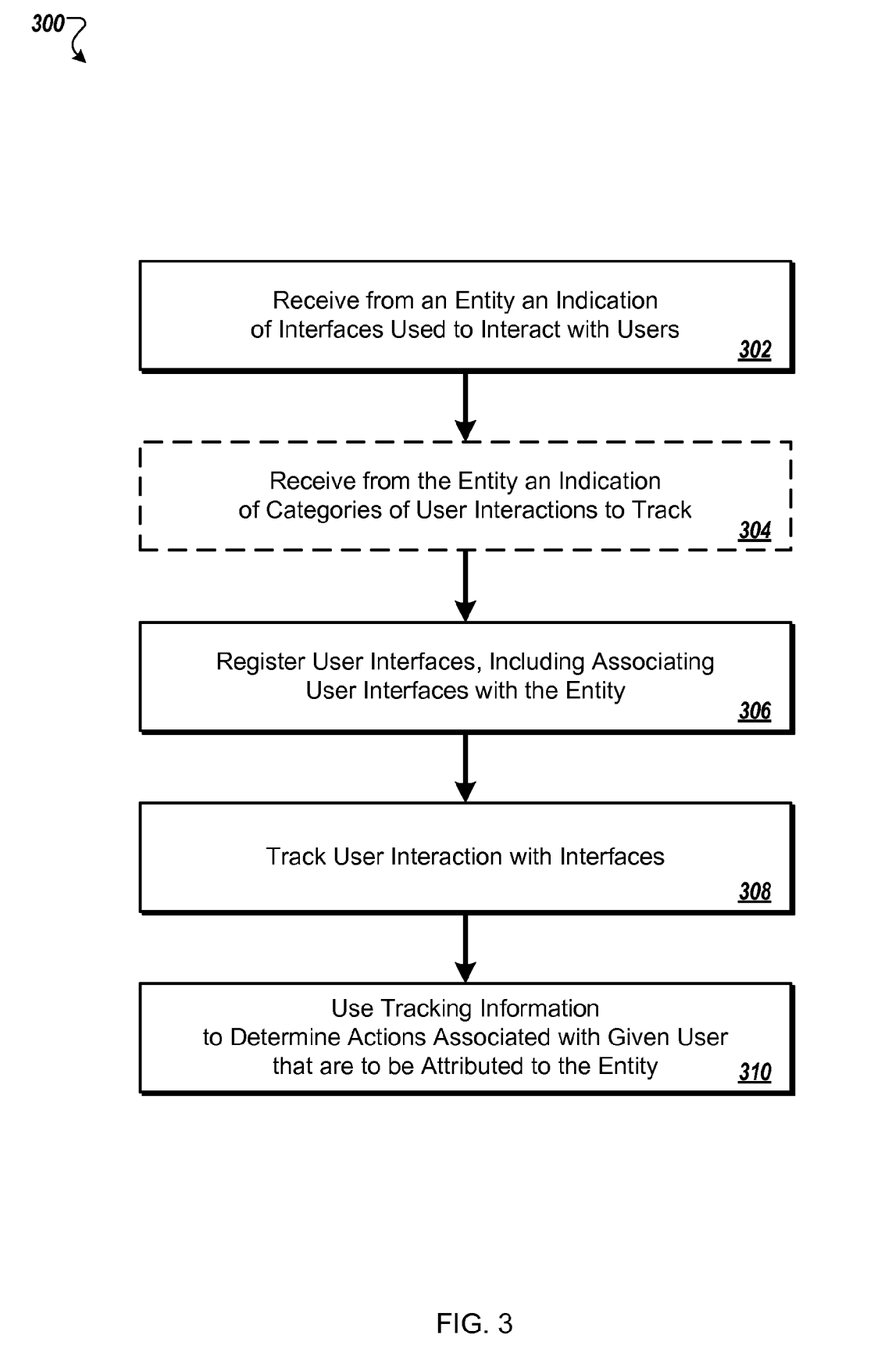
FIGS. 3-7 are flowcharts of example processes for tracking and correlating user interactions with interfaces.

FIG. 3 is a flowchart of an example process 300 for tracking and correlating user interactions with interfaces. In some implementations, the process 300 may be performed by the system 100, and will be described as such for purposes of clarity. Briefly, the process 300 includes receiving from an entity an indication of interfaces used to interact with users, registering user interfaces, tracking user interaction with interfaces, and using tracking information to determine actions associated with a given user that are to be attributed to the entity.

In more detail, an indication of a plurality of interfaces that are used to interact with users is received (302) from an entity. For example, the computing server(s) 110 can receive the indication from the entity 140a. In some implementations, receiving the indication may include receiving an indication of one or more web interfaces. For example, the entity 140a can include in the indication one or more web pages associated with web sites maintained by the entity 140a, and can include in the indication one or more web pages associated with web sites maintained by third parties. Third party web sites can include sites such as e-commerce sites, review sites, media sites, news sites, message forums, question and answer forums, social networking sites, and other information sources.

In some implementations, receiving the indication may include receiving an indication of a web interface associated with the entity, and a social networking interface associated with the entity. To describe a few possibilities, the web interface associated with the entity can be provided by an e-commerce site (e.g., a web page offering for sale one or more of the entity's products or services), a review site (e.g., a web page listing reviews for products or services offered by the entity), a media site (e.g., a web page presenting advertisements or viral media associated with the entity), a news site (e.g., a web page presenting a news article or press release associated with the entity), a message forum site (e.g., a web page listing comments, ratings, links, and other user-supplied content which may pertain to the entity), and a question and answer forum site (e.g., a web page listing questions and answers supplied by users which may pertain to the entity). The social networking interface can be a social networking interface such as a microblogging interface (e.g., an interface including status updates, posts, message boards, etc.), a message forum interface, and a user review interface (e.g., an interface including reviews of businesses, products, goods, services, etc.). For example, the social network interfaces may include pages associated with the entity (e.g., profile pages, group pages, and fan pages), and may include pages associated with one or more individuals associated with the entity (e.g., employees, representatives, and agents).

In some implementations, receiving the indication may include receiving (304) from the entity an indication of one or more types of interactions to track. For example, the entity 140a may indicate that comments posted to one or more social networking sites maintained by the entity 140a are to be tracked. As another example, the entity 140a may indicate that ratings supplied by users 104 to a third-party product review site are to be monitored or tracked.

The plurality of user interfaces is registered (306), including associating the plurality of user interfaces with the entity. For example, the registration manager 120 can associate each of the interfaces 130 with the entity 140a. In some implementations, registering the user interfaces can include creating a profile for an entity and associating each interface with the entity. For example, a profile for the entity 140a may include various identifying information associated with the entity, such as social networking page and profile identifiers, microblogging account identifiers, common tags, blog and web site addresses, and may include similar information for one or more individuals associated with the entity. By creating a profile for the entity, for example, the plurality of user interfaces associated with the entity may be connected with the entity and with each other.

User interaction with the interfaces is tracked (308), including attributing user interaction by a user in any of the plurality of interfaces as interaction with the entity. For example, the user 104a may use the client device 102a to access the interface 130a, and the interaction can be attributed as an interaction with the entity 140a. In some implementations, tracking user interaction may include tracking information using cookies. For example, the computing server(s) 110 can receive user cookie information from the content server(s) 108, and can provide the cookie information to the user interaction tracker 122. In some implementations, the user cookie information can be associated with one or more user sessions with a given one of the plurality of user interfaces. For example, the user 104a may log in to a web site that provides the interface 130a. Upon enabling the user 104a to log in, for example, the content server(s) 108 can maintain cookie information associated with the user session, and can provide the cookie information to the computing server(s) 110, where it may be received by the user interaction tracker 122.

In some implementations, tracking user interaction may include using pixels to track user interactions. For example, invisible pixels may be included on web pages where the entity 140a can embed an image. Thus, users who visit the web pages including the invisible pixels can be associated with cookies used for subsequent tracking, and these cookies can be correlated to the same cookie on other sites.

In some implementations, tracking user interactions may include associating a user with multiple user identities. For example, it may be determined that the user 104a is associated with various online profiles (e.g., social networking site profiles). Thus, for example, using mechanisms such as user names and cross-posts, interactions of the user 104a using any of the profiles may be tracked by the user interaction tracker 122, and may be associated with the user 104a by the correlation identifier 124. By associating a particular user with multiple user identities, for example, interactions of the user may be tracked across interfaces and attributed to the user without the use of cookies, in some cases.

The tracking information is used to determine (310) all actions associated with a given user that are to be attributed to the entity. For example, the correlation identifier 124 can attribute actions associated with the user 104a to the entity 140a. User actions, for example, can include interactions with one or more of the interfaces 130, such as web page views, media content plays, item purchases, postings, comments, communications, ratings, likes, group joins, friend connections, and other interactions.

In some implementations, using the tracking information may include determining that a user action that is detected at a first interface associated with the entity is related to an interaction by the user on a second, different interface associated with the entity. For example, the correlation identifier 124 can refer to tracking information provided by the user interaction tracker 122 to determine that the user 104a interacts with the interface 130*a* (e.g., a web page including an advertisement associated with the entity 140*a*). If the user 104*a* accesses the interface 130*b* (e.g., a blog including entries associated with the entity 140*a*), for example, the user interaction tracker 122 may provide information associated with the interface 130*b*, and the correlation identifier 124 may determine that the information is related to the interface 130*a*. For example, the correlation identifier 124 may determine that the blog included in the interface 130*b* includes text or links related to the advertisement presented by the interface 130*a*.

In some implementations, using the tracking information may include determining that a user action that is detected at a first interface associated with the entity is related to a user interaction that is detected at a second, different interface associated with the entity. For example, the correlation identifier 124 can determine that the user 104*a* first interacted with the interface 130*a* (e.g., the web page including the advertisement). If the user 104*a* interacts with the interface 130*b* (e.g., the blog) by posting a comment or link, for example, the user interaction tracker 122 may provide information associated with the interaction with the interface 130*b*, and the correlation identifier 124 may determine that the interaction is related to the interface 130*a*. For example, the correlation identifier 124 may determine that the user 104*a* posted a comment about the advertisement presented by the interface 130*a*, or that the user 104*a* posted a link to the interface 130*a*.

Figure 4:
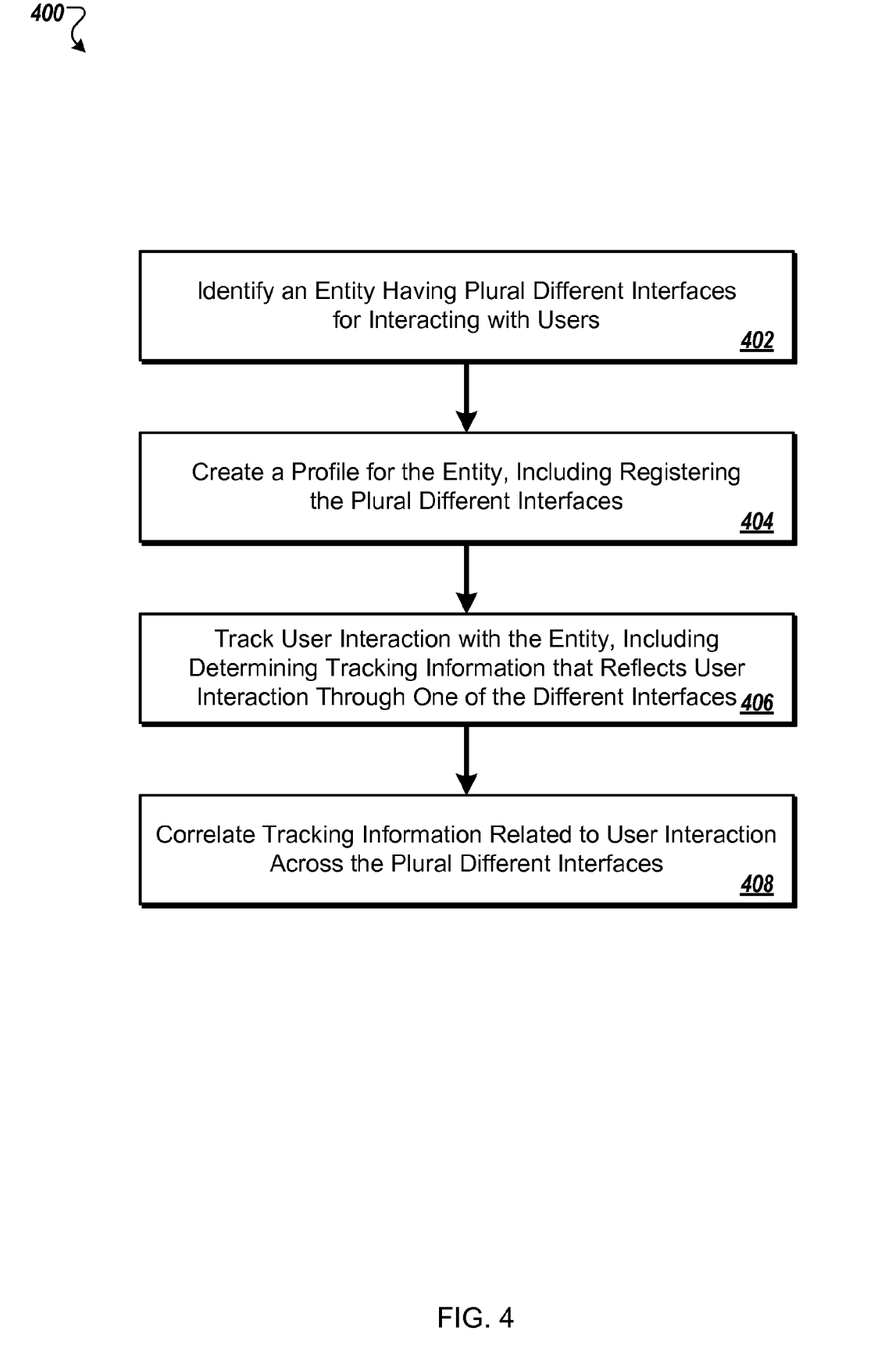

FIG. 4 is a flowchart of an example process 400 for tracking and correlating user interactions with interfaces. In some implementations, the process 400 may be performed by the system 100, and will be described as such for purposes of clarity. Briefly, the process 400 includes identifying an entity having plural different interfaces for interacting with users, creating a profile for the entity, tracking user interaction with the entity, and correlating tracking information related to user interaction across the plural different interfaces.

In more detail, an entity is identified (402), the entity having plural different interfaces for interacting with users. For example, the computing server(s) 110 can identify the entity 140*a*, having interfaces 130 for interacting with users. A profile for the entity is created (404) including registering the plural different interfaces. For example, the registration manager 120 can create a profile for the entity 140*a* and can register the interfaces 130 in association with the entity 140*a*.

Interaction with the entity is tracked (406), including determining tracking information that reflects individual user interaction by a respective user through one of the plural different interfaces. For example, the user 104*a* can employ the client device 102*a* to interact with the interface 130*a*, and the user interaction tracker 122 can track the interactions. User interactions can include views, plays, purchases, promotional code usage, postings, comments, communications (e.g, e-mails, messages, microblog updates, posts, or chats), ratings, joins, connections, and other interactions.

Tracking information related to user interaction across plural different interfaces is correlated (408). For example, the correlation identifier 124 can analyze tracking information provided by the user interaction tracker 122 to correlate user interactions. Various techniques for connecting user interaction events may be used, such as strict correlation, and other mechanisms for finding related clusters and groupings. In some implementations, a user interaction related to one of the plural different interfaces may be correlated with a user interaction with a different one of the plural different interfaces associated with the entity. In the present example, after employing the client device 102*a* to interact with the interface 130*a*, the user 104*a* can employ the device 102*a* to interact with the interface 130*b*. The user interaction tracker 122 can track the interactions, and the correlation identifier 124 can then correlate the interaction of the user 104*a* with the interface 130*a* to the interaction with the interface 130*b*. For example, the interfaces 130*a*, 130*b* may both be determined to be associated with the entity 140*a*, or with related content associated with the entity 140*a*.

Figure 5:
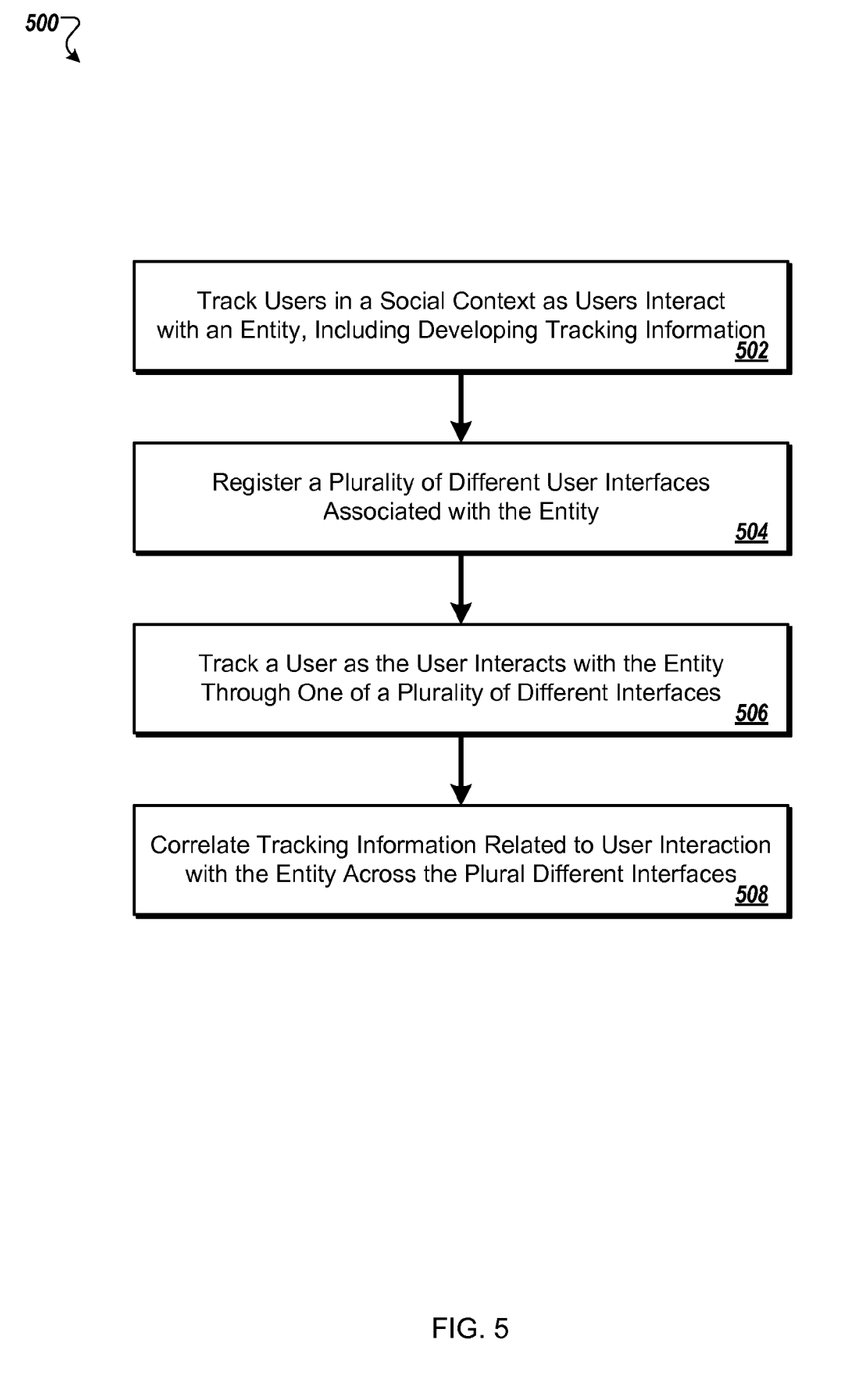

FIG. 5 is a flowchart of an example process 500 for tracking and correlating user interactions with interfaces. In some implementations, the process 500 may be performed by the system 100, and will be described as such for purposes of clarity. Briefly, the process 500 includes tracking users in a social context as users interact with an entity, registering a plurality of different user interfaces associated with the entity, tracking a user as the user interacts with the entity through one of a plurality of different interfaces, and correlating tracking information related to user interaction with the entity across the plural different interfaces.

In more detail, users are tracked (502) in a social context as users interact with an entity. For example, multiple users (e.g., users 104*a*, 104*n*) can interact with the entity 140*a* through a plurality of interfaces 130. The interfaces 130, for example, can provide content associated with the entity 140*a* to the users 104*a*, 104*n*, can enable the users to provide content and/or feedback, and can enable the users to communicate with the entity 140*a* and/or with each other.

Tracking users can include registering (504) a plurality of different user interfaces associated with the entity, each user interface being provided by the entity to support interaction with users. For example, the registration manager 120 can register the interfaces 130 associated with the entity 140*a*. Tracking users can also include tracking a user as the user interacts with the entity through one of a plurality of user interfaces. For example, the user interaction tracker 122 can track any of the users 104*a*, 104*n* as the users interact with the entity 140*a* through one of the interfaces 130. Tracking information relating to user interaction with the entity may be correlated (508) across the plurality of different interfaces. For example, as the users 104*a*, 104*n* interact with the entity 140*a* across the interfaces 130, the interaction may be correlated. Thus, for example, general patterns of user interaction behavior may be determined. For example, if multiple users 104 post questions or provide feedback to the entity 140*a* at interface 130*b* after interacting with content provided through interface 130*a*, patterns may be identified by analyzing the nature (e.g., positive, negative, indifferent) of the questions or feedback.

In some implementations, the users 104*a*, 104*n* may interact with the entity through one or more of the interfaces 130. For example, the user 104*a* can view an advertisement associated with the entity 140*a* using the interface 130*a* and can post a link to the advertisement at the interface 130*b*. The user 104*n* may then view and visit the link at the interface 130*b*, for example, and may provide feedback (e.g., a comment, a rating, or the like) associated with the advertisement. Information related to user interactions with each other through the interfaces 130 may be tracked and correlated. To ensure privacy of the users 104*a*, 104*n*, for example, publically provided information may be used for tracking.

Figure 6:
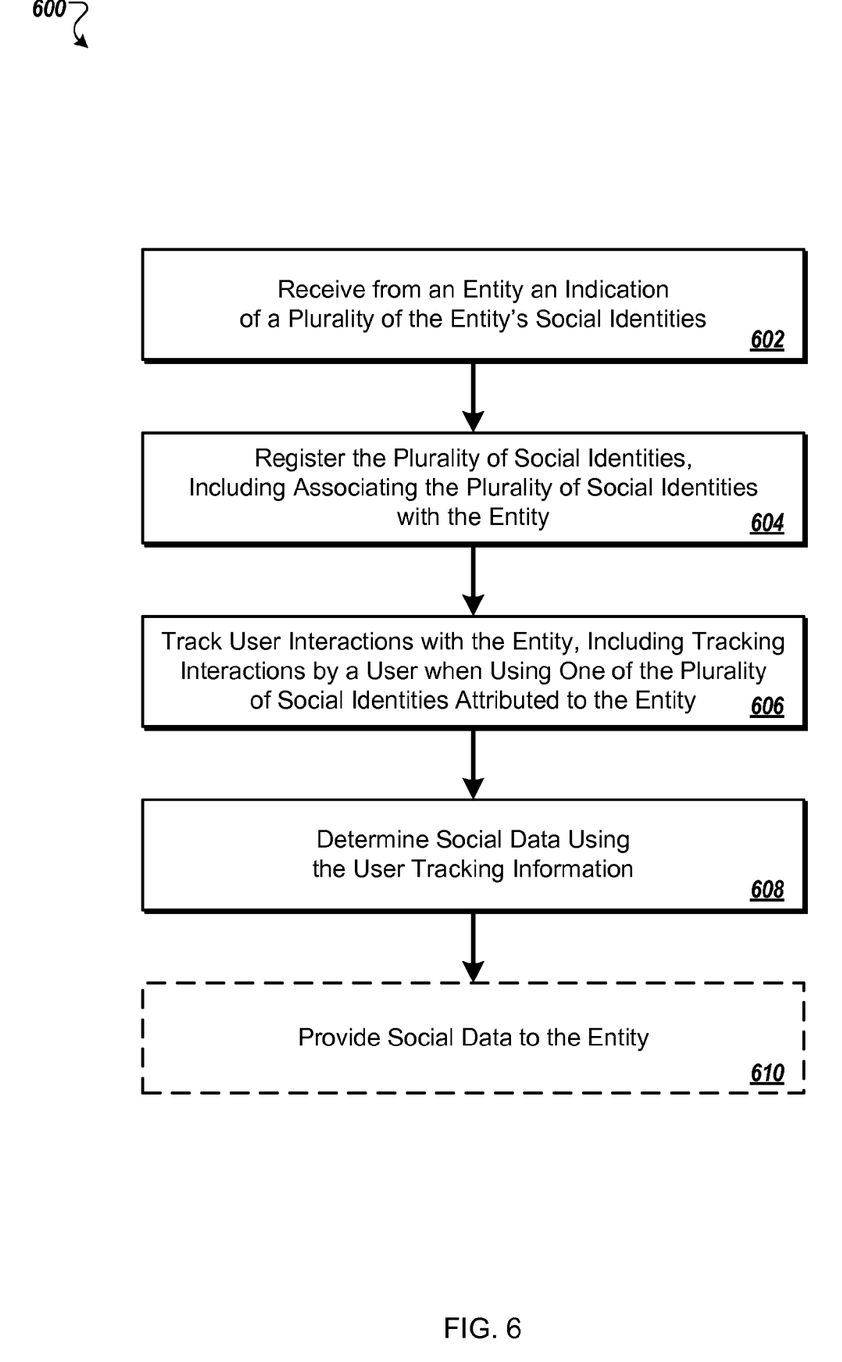

FIG. 6 is a flowchart of an example process 600 for tracking and correlating user interactions with interfaces. In some implementations, the process 600 may be performed by the system 100, and will be described as such for purposes of clarity. Briefly, the process 600 includes receiving from an entity and indication of a plurality of the entity's social identities, registering the plurality of social identities, tracking user interactions with the entity, and determining social data using the user tracking information.

An indication is received (602) of a plurality of an entity's social identities. For example, the entity 140a can provide social identity information to the computing server 110. In some implementations, receiving the indication of the entity's social identities may include receiving identifiers associated with the entity's social identities. For example, the entity 140a may be associated multiple online presences, and identifiers may be provided for one or more of the presences. The identifiers, for example, can include such identifiers as identifiers associated with social networking pages, social networking profiles, microblogging accounts, user review accounts, message forum user names, blogs, websites, common tags, and identifiers associated with names, locations, or other information associated with a predetermined group of employees associated with the entity. Thus, for example, an identifier can be received for a social networking profile of the entity 140a, and identifiers can be received for social networking profiles of one or more individuals (e.g., representative employees or the like) associated with the entity 140a.

The plurality of social identities are registered (604) including associating the plurality of social identities with the entity. For example, the registration manager 120 can associate social identities with the entity 140a by using one or more storage devices to maintain and access the social identity information.

User interactions with the entity are tracked (606), including tracking user interactions by a user with the entity when using one of the plurality of social identities attributed to the entity, where tracking includes determining tracking information. For example, the user interaction tracker 122 can track interactions by the user 104a when using one of the plurality of social identities attributed to the entity 140a. The user 104a, for example, may use a social networking profile of the entity 140a to interact with the entity 140a. As another example, the user 104a may refer to the social networking profile of the entity 140a when posting a comment about the entity 140a to a social networking site.

Social data is determined (608) using the user tracking information. For example, the correlation identifier 124 can analyze tracking information identified by the user interaction tracker 122 to determine social data. Social data may be used to determine the effectiveness of marketing campaigns, and to identify potentially influential users, for example.

In some implementations, determining social data may include following status and other communication signups by the user. For example, the user 104a can sign up to follow updates provided by the entity 140a (or one or more individuals associated with the entity 140a) through a social networking profile. As another example, the user 104a can sign up to receive direct communications such as e-mails or text messages from the entity 140a.

In some implementations, determining social data may include determining a number of mentions related to the entity. For example, public posting forums (e.g., message boards, blogs, review sites, question and answer sites, and the like) can be reviewed by the user interaction tracker 122 for mentions related to the entity 140a. Mentions can include mentions of the entity 140a by name, mentions of individuals associated with the entity 140a, mentions of products or services associated with the entity, mentions of content associated with the entity, or mentions of locations associated with the entity, to describe a few possibilities.

In some implementations, determining social data may include determining a number of re-shares/re-broadcasts associated with the entity. For example, the user 104a may view a microblog update posted by the entity 140a, and the user may elect to re-share content associated with the update using his or her account. As another example, the user 104a may view content associated with the entity 140a posted to a social networking page, and may elect to re-share the content to his or her followers. The user interaction tracker 122, for example, can count the number of re-shares/re-broadcasts.

In some implementations, determining social data may include determining likes on a business site associated with the entity and likes on a page mentioning the entity. For example, the entity 140a can include a control on its website enabling any of the users 104 having social networking accounts configured to interact with the control to have information related to the interaction displayed in their social networking friends' content feeds, including a link to the website. Similarly, for example, pages mentioning the entity 140a can include such controls. In some cases, information associated with users having interacted with one or more controls associated with the entity 140a can be provided to the user interaction tracker 122.

In some implementations, determining social data may include determining communications or interactions by one or more users with the entity. For example, direct communication (e.g., replies, @replies, questions asked, etc.) of the user 104a with the entity 140a via can be provided to the user interaction tracker 122. In some cases, engagement between followers can be used in determining social data. For example, multiple followers may communicate with each other (e.g., through a message board thread, a chat session, or the like), and such communication can be reviewed for relevance to the entity 140a.

In some implementations, determining social data may include determining a number of engaged friends of a user. For example, the user 104a may post a message to a social networking public content display interface associated with the entity 140a. The user interaction tracker 122 can receive information associated with the user 104a, including a number of engaged friends of the user 104a. Such information may be used to identify potentially influential users, for example. By connecting users to each other through their social graphs and by creating timelines across related users, for example, influential users may be identified. In some cases, links between users may be implicit (e.g., links based on re-shares) and connections between users may be identified without using explicit social graphs.

In some implementations, determining social data may include measuring user behaviors prior to and following different marketing campaigns provided by an entity on one or more sites associated with the entity. For example, the entity 140a may launch a marketing campaign using one or more of the interfaces 130. For example, the interface 130a may be used to deliver content (e.g., video, audio, text, etc.) associated with the campaign to the users 104, the interface 130b may be used to provide to the users 104 and receive from the users 104 posts and messages associated with the campaign, and the interface 130c may be used to enable the users 104 to sign up for e-mail communication with the entity 140a. Prior to and following the various phases of the marketing campaign, for example, behaviors of the users 104 can be tracked by the user interaction tracker 122 and analyzed by the correlation identifier 124 to determine social data.

In some implementations, social data is provided (610) to the entity. For example, the entity 140a can receive social data from the computing server(s) 110. The social data may be used by the entity 140a to determine the effectiveness of the phases of the marketing campaign, for example.

Figure 7:
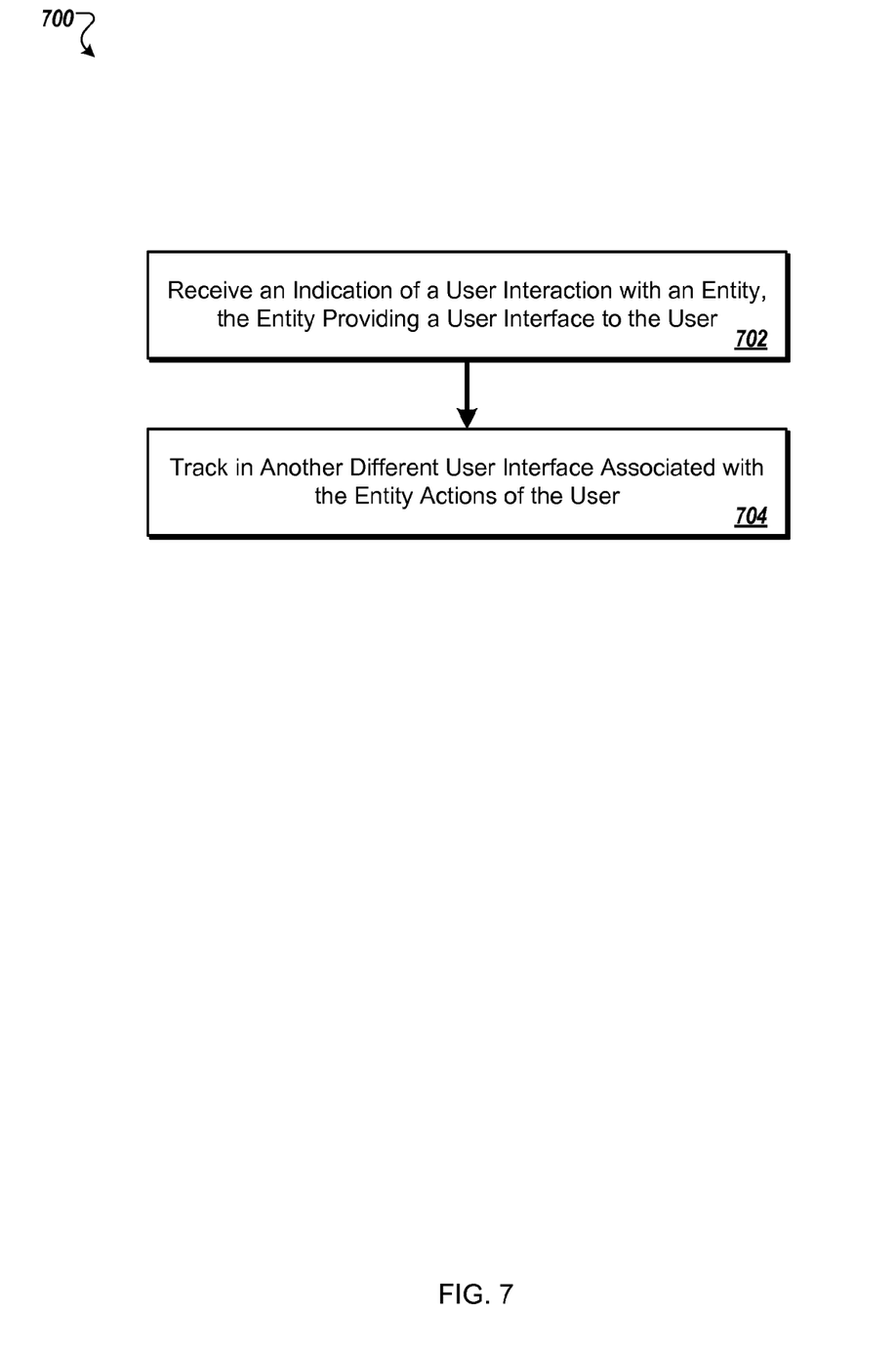

FIG. 7 is a flowchart of an example process 700 for tracking and correlating user interactions with interfaces. In some implementations, the process 700 may be performed by the system 100, and will be described as such for purposes of clarity. Briefly, the process 700 includes receiving an indication of a user interaction with an entity, and tracking actions of the user in another, different user interface associated with the entity.

An indication of a user interaction with an entity is received (702), the entity providing a user interface to the user. For example, the user interaction tracker 122 can receive an indication of interaction of the user 104a with the entity 140a. The user 104a, for example, can use the client device 102a to interact with the entity 140a via the interface 130a.

In another different user interface associated with the entity, actions of the user are tracked (704) after receipt of the indication. For example, the user 104a can subsequently use the client device 102a to interact with the interface 130b associated with the entity 140a.

By tracking and analyzing user engagement metrics, businesses may be enabled to optimize their social marketing efforts. For example, time-based changes can be correlated to changes in user behavior over time. Moreover, directly measurable interactions (e.g., interactions tracked using cookies, pixels, link clicks, or the like) can be used to divide users into groups based on whether or not they interacted with particular communications.

Another division of metrics can include dividing users based on behavioral patterns. For example, user communications related to an entity (e.g., mentions based on name, location, tag, microblog updates, re-shares, likes, etc.) can be used to sub-divide engaged users, and can be used to develop tracking metrics for each of the sub-groups. In some cases, this information may be used to engage with users directly. For example, users with positive or negative sentiment towards the entity may be identified, in addition to potentially influential users. Based on such information, for example, entities (e.g., businesses) may be enabled to improve interactions with users, and may be enabled to target their marketing and promotions to particular users.

Figure 8:
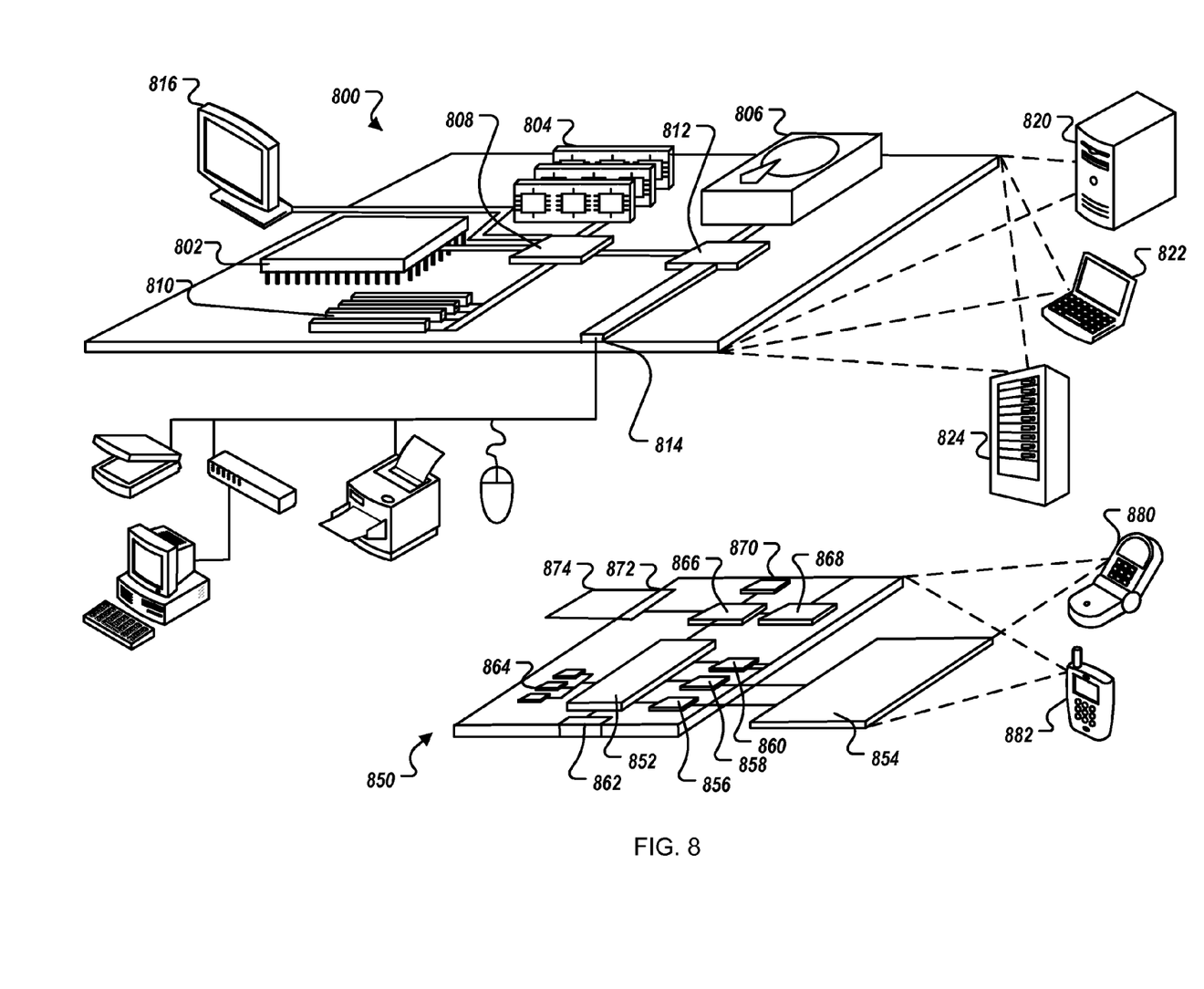
FIG. 8 shows an example of a computer device and a mobile computer device that can be used to implement the techniques described here.

FIG. 8 shows an example of a generic computer device 800 and a generic mobile computer device 850, which may be used with the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, memory on processor 802, or a propagated signal.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, memory on processor 852, or a propagated signal that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
   receiving, by one or more processors, from a sponsor of content an indication of a plurality of interfaces that are used to interact with users, each interface being presented in a different domain;
   registering, by one or more processors, the plurality of user interfaces including associating the plurality of user interfaces with the sponsor;
   tracking, by one or more processors, user interactions with the interfaces;
   identifying, based on the tracking, a first pattern of user interactions for a first user and a second pattern of user interactions for a second user, the first user being different than the second user, wherein the first pattern of user interactions comprises the first user posting, to a website, a question related to a product;
   comparing, by one or more processors, the first pattern of user interactions for the first user with the second pattern of user interactions for the second user; and
   determining, by one or more processors, based on the comparing, one or more product-related messages viewed by the first user resulting in a specific type of action related to the sponsor that are different than product-related messages viewed by the second user resulting in the same specific type of action, wherein determining one or more product-related messages viewed by the first user comprises determining that the first user returned to the website to view an answer to the question.

2. The method of claim 1 where receiving an indication of a plurality of interfaces includes receiving an indication of one or more web interfaces.

3. The method of claim 1 where receiving an indication of a plurality of interfaces includes receiving an indication of a web interface associated with the sponsor and a social networking interface associated with the sponsor.

4. The method of claim 3 where the social networking interface is a microblogging interface.

5. The method of claim 3 where the social networking interface is a message forum interface.

6. The method of claim 3 where the social networking interface is a user review interface.

7. The method of claim 1 where registering the user interfaces includes creating a profile for a sponsor and associating each interface with the sponsor.

8. The method of claim 1 further comprising receiving from the sponsor an indication of one or more types of user interaction to track.

9. The method of claim 1 where tracking user interaction includes tracking user interaction using cookies.

10. The method of claim 9 where tracking user interaction includes receiving user cookie information associated with sessions by the user with a given one of the plurality of user interfaces.

11. The method of claim 10 where tracking includes receiving user cookies associated with the sessions.

12. The method of claim 1 where tracking user interaction includes using pixels to track user interactions.

13. The method of claim 1 where tracking user interaction includes associating the user with multiple user identities.

14. The method of claim 1 where using the tracking information includes determining that a user action that is detected at a first interface associated with the sponsor is related to information presented to the user on a second, different interface associated with the sponsor.

15. The method of claim 1 where using the tracking information includes determining that a user action that is detected at a first interface associated with the sponsor is related to a user action that is detected at a second, different interface associated with the sponsor.

16. The method of claim 1, wherein the specific type of action is a purchase of a product from an e-commerce web page.

17. The method of claim 16, wherein the one or more actions associated with the first user comprise viewing one or more reviews related to the product that were not provided to the second user.

18. The method of claim 16, wherein the one or more actions associated with the first user comprise one or more interactions with one or more third users regarding the product.

19. The method of claim 1, wherein tracking the user interactions comprises maintaining a timeline of user interactions for the first user and for the second user, wherein using the tracking information comprises analyzing tracked interface interactions of the first user and the second user along corresponding timelines to identify patterns of user engagement.

20. The method of claim 1, wherein the product-related messages comprise a. product review or a product advertisement.

21. A method comprising:
   identifying, by one or more processors, a sponsor of content, the sponsor having plural different interfaces for interacting with users;
   creating, by one or more processors, a profile for the sponsor including registering the plural different interfaces;
   tracking, by one or more processors, user interaction with the sponsor including determining tracking information that reflects individual user interaction by one or more respective users through one of the plural different interfaces;
   identifying, based on the tracking, a first pattern of user interactions for a first user and a second pattern of user interactions for a second user, the first user being different than the second user, wherein the first pattern of user interactions comprises the first user posting, to a website, a question related to a product;
   comparing, by one or more processors, the first pattern of user interactions for the first user with the second pattern of user interactions for the second user;
   correlating, by one or more processors, the tracking information across the plural different interfaces; and
   determining, based at least in part on the correlating and the comparing, one or more product-related messages viewed by the first user resulting in a specific type of action that are different than one or more product-related messages viewed by the second user resulting in the same specific type of action, wherein determining one or more product-related messages viewed by the first user comprises determining that the first user returned to the website to view an answer to the question.

22. The method of claim 21 where correlating includes correlating a user interaction related to one of the plural different interfaces with a user interaction with a different one of the plural different interfaces associated with an entity.

23. The method of claim 21, wherein the product-related messages comprise a product review or a product advertisement.

24. A method comprising:
    tracking, by one or more processors, users in a social context as users interact with an entity including developing tracking information, where tracking includes:
    registering, by one or more processors, a plurality of different user interfaces associated with the entity, each user interface being provided by the entity to support interaction with users;
    tracking, by one or more processors, a first user and a second user as the first user and the second user interact with the entity through one or more of a plurality of different interfaces, the first user being different than the second user;
    identifying, based on the tracking, a first pattern of user interactions for the first user and a second pattern of user interactions for the second user, wherein the first pattern of user interactions comprises the first user posting, to a website, a question related to a product;
    comparing the first pattern of user interactions for the first user with the second pattern of user interactions for the second user; and
    determining, based on the comparing, one or more product-related messages viewed by the first user resulting in a specific type of action that are different than product-related messages viewed by the second user resulting in the same specific type of action, wherein determining one or more product-related messages viewed by the first user comprises determining that the first user returned to the website to view an answer to the question.

25. The method of claim 24 further comprising correlating tracking information relating to user interaction with the entity across the plural different interfaces.

26. The method of claim 24, wherein the product-related messages comprise a product review or a product advertisement.

27. A method comprising:
    receiving, from a first user interface, one or more indications of user interaction associated with a sponsor of content and leading to a specific type of action performed by a first user;
    tracking in another different user interface one or more user actions of a second user after receipt of the indication and leading to the specific type of action performed by the second user, the first user being different than the second user;
    identifying, based on the tracking, a first pattern of user interactions for the first user and a second pattern of user interactions for the second user, wherein the first pattern of user interactions comprises the first user posting, to a website, a question related to a product;
    comparing the first pattern of user interactions for the first user with the second pattern of user interactions for the second user; and
    identifying, based on the comparing, one or more product-related messages viewed by the second user leading to the specific type of action performed by the second user that are different than one or more product-related messages viewed by the first user leading to the specific type of action performed by the first user, wherein determining one or more product-related messages viewed by the first user comprises determining that the first user returned to the website to view an answer to the question.

28. The method of claim 27, wherein the product-related messages comprise a product review or a product advertisement.

* * * * *